No. 730,434. PATENTED JUNE 9, 1903.
C. C. BOWEN.
ANIMAL TRAP.
APPLICATION FILED MAY 19, 1902.
NO MODEL.
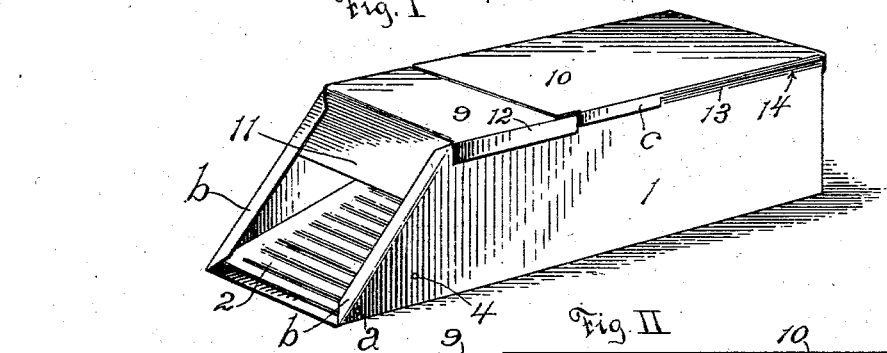
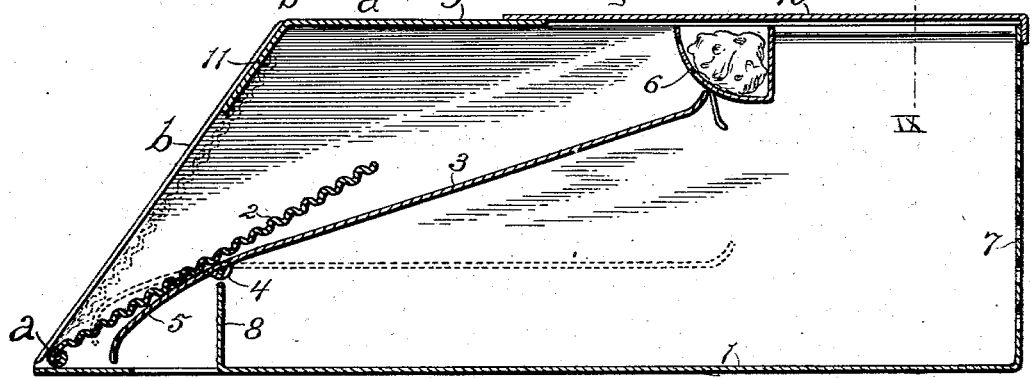
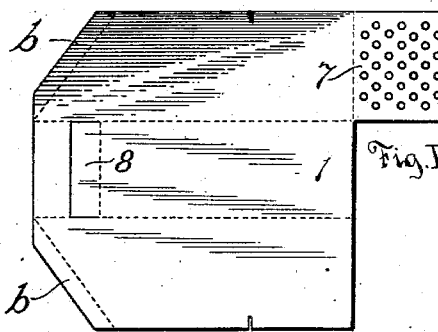
Witnesses
C. C. Holly
J. Townsend
Inventor
C. C. Bowen
by Townsend Bro
his atty No. 730,434. Patented June 9, 1903.

UNITED STATES PATENT OFFICE.

CALVIN CASE BOWEN, OF LOS ANGELES, CALIFORNIA, ASSIGNOR TO RINDGE MANUFACTURING COMPANY, OF LOS ANGELES, CALIFORNIA, A CORPORATION OF CALIFORNIA.

ANIMAL-TRAP.

SPECIFICATION forming part of Letters Patent No. 730,434, dated June 9, 1903.

Application filed May 19, 1902. Serial No. 107,929. (No model.)

*To all whom it may concern:*

Be it known that I, CALVIN CASE BOWEN, a citizen of the United States, residing at Los Angeles, in the county of Los Angeles and State of California, have invented a new and useful Animal-Trap, of which the following is a specification.

My invention relates particularly to a trap into which one or more animals may be lured and retained therein alive until released or destroyed by an attendant.

One object of my invention is to provide a continuous or self-setting trap which can be economically manufactured, is of simple construction, and does not depend for its operation upon springs, catches, cords, and the like.

Another object is to provide a trap which may be used to catch valuable and other animals without submitting them to torture or to catch animals having valuable skins or fur which should not be mutilated.

Referring to the drawings, Figure I is a perspective view of a trap embodying the invention. Fig. II is a longitudinal sectional view of the same. Figs. III, IV, V, VI, VII, and VIII are views showing blanks from which parts may be formed which are used in the construction of the trap. Fig. IX is a fragmentary detail.

The trap comprises a box 1, one end of which is preferably inclined.

2 is an inclined outer door, desirably corrugated and pivoted at $a$ and lying normally in the position shown in Fig. II, but adapted to close an opening in the inclined end of the box, as hereinafter described.

3 is an inclined inner door pivoted at 4 above its lower end and normally closing the box—that is to say, it shuts off the rear part of the box and divides the interior of the box into two compartments, the front one being normally open and the rear one normally closed. One end of the inner door 3 may have a curved end 5, upon which the outer door 2 normally rests. The other end of the door 3 may when at rest bear against or be near a wall 6, which may be perforated and is supported by the box 1 and forms a receptacle for suitable bait. The weight of the outer door 2, bearing against the curved end 5 of the door 3, is sufficient to close the inner door 3 and normally hold it in set position, as shown in full lines in Fig. II.

The rear end of the box 1 may be perforated to admit air and to allow inspection of the interior of the trap.

8 is a wall which extends from the bottom of the box to a point near the pivot 4, as shown in Fig. II, to keep any animal from crowding under the front extension 5 of the door 3, and thereby preventing the self-setting action of the trap. The upper portion of the box may be closed by removable covers 9 and 10. The cover 9 may be provided with a wing 11, which may rest against the inner sides of wings $b$ and partially cover the inclined end of the box 1. The cover 9 is also provided with side wings 12, which serve to hold the cover from lateral movement. The cover 10 may be provided with projections 13, which may fit into grooves 14, formed at the upper edge of the box. (See Fig. IX.)

C designates wings extending from the cover 10 and which engage the upper edge of the box 1 and serve to further hold the cover.

The trap may comprise but eight parts, including two pivot rods or wires.

Fig. III shows a blank from which the main portion of the box may be formed, the dotted lines indicating the places for bending.

Fig. IV represents a blank from which the outer door 2 may be formed.

Fig. V represents a blank from which the inner door 3 may be formed.

Fig. VI represents a blank from which the wall 6 of the bait-receptacle may be formed.

Fig. VII represents a blank from which the cover 9 may be formed.

Fig. VIII represents a blank from which the cover 10 may be formed.

The parts of the trap normally rest in the position shown in full lines in Fig. II. The animal, being attracted by the bait, passes up the inclined outer door 2, and as soon as he steps therefrom onto the inner door 3 his weight is sufficient to overbalance the weight of the outer door and cause the inner door 3 to drop to the position shown in dotted lines.

As the main body of door 3 drops the curved end 5 thereof acts against the outer door 2 and moves the same into the position shown in dotted lines, thus closing the entrance of the trap. The animal finding his original entrance closed and being unsuccessful in obtaining the bait 61 seeks to escape from the trap and naturally goes toward the perforated wall 7. As soon as the animal steps from the inner door 3 the weight of the outer door 2 overbalances the weight of the inner door 3 and raises the door 3 to its original position, as shown in full lines. As long as the animal remains upon the door 3 the door 2 bars his escape, and when the animal has stepped off the door 3 the door 3 bars his escape and the door 2 comes again into position to allow the entrance of another animal.

It is obvious that many changes may be made in the particular construction herein shown and described without departing from the spirit of the invention.

What I claim, and desire to secure by Letters Patent of the United States, is—

1. An animal-trap comprising an open-ended box, an outer door pivoted at the lower part of the open end of the box, an inner pivoted door, the part of the inner door which extends from the pivotal line to one end being substantially straight, the other part of the inner door which extends from the pivotal line being gradually curved away from the plane of the straight part and terminating at a point considerably beyond the pivotal line, the curved part bearing against the outer door.

2. An animal-trap comprising a box, one end being inclined and open, opposite parallel wings extending along the inclined open end of the box, each wing projecting inwardly from a side of the box, an outer door pivoted at the lower part of the open end of the box, and an inner door pivoted to the box, one part of the inner door extending considerably beyond the pivotal line and being gradually curved away from the plane of the other part and bearing against the outer door.

3. An animal-trap comprising a box, one end being inclined and open, an outer door pivoted at the lower part of the open end of the box, a bait-receptacle in the upper part of the box and nearly midway between the two ends of the box, and an inner door pivoted to the box, one part of the inner door being gradually curved away from the other part and bearing against the outer door, the other part of the inner door normally resting against the bait-receptacle thereby dividing the box into two compartments.

4. An animal-trap comprising a box, one end being inclined and open, opposite parallel wings extending along the inclined open end of the box, each wing projecting inwardly from a side of the box, an outer door pivoted at the lower part of the open end of the box, and an inner door pivoted to the box, one part of the inner door extending considerably beyond the pivotal line and being gradually curved away from the plane of the other part and bearing against the outer door, a cover for the box composed of two pieces, one of said pieces having an inclined wing which partially covers the open end of the box the wing bearing against the inside of the aforesaid parallel wings, said piece also being provided with a pair of wings which lap over the upper edge of the box, and projections on the other of said pieces which slidably engage with grooves in the upper portion of the box.

In testimony whereof I have signed my name, in the presence of two subscribing witnesses, at Los Angeles, in the county of Los Angeles and State of California, this 7th day of May, 1902.

CALVIN CASE BOWEN.

Witnesses:
G. T. HACKLEY,
JAMES R. TOWNSEND.